United States Patent
Piszczek et al.

(10) Patent No.: US 9,652,160 B1
(45) Date of Patent: May 16, 2017

(54) METHOD AND SYSTEM FOR DATA MIGRATION BETWEEN HIGH PERFORMANCE COMPUTING ENTITIES AND A DATA STORAGE SUPPORTED BY A DE-CLUSTERED RAID (DCR) ARCHITECTURE WITH I/O ACTIVITY DYNAMICALLY CONTROLLED BASED ON REMAINING HEALTH OF DATA STORAGE DEVICES

(71) Applicant: DATADIRECT NETWORKS, INC., Chatsworth, CA (US)

(72) Inventors: Michael J. Piszczek, Laurel, MD (US); Jason M. Cope, Highland, MD (US); Zhiwei Sun, Laurel, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 0 days.

(21) Appl. No.: 14/934,314

(22) Filed: Nov. 6, 2015

(51) Int. Cl.
*G06F 12/00* (2006.01)
*G06F 3/06* (2006.01)

(52) U.S. Cl.
CPC .......... *G06F 3/0616* (2013.01); *G06F 3/0647* (2013.01); *G06F 3/0653* (2013.01); *G06F 3/0683* (2013.01)

(58) Field of Classification Search
CPC .... G06F 3/0616; G06F 3/0683; G06F 3/0653; G06F 3/0647; G06F 11/0727; G06F 11/0793; G06F 12/16; G06F 3/0634; G06F 3/0689
USPC .................... 711/114, 156; 714/6.22; 710/40
See application file for complete search history.

(56) References Cited

U.S. PATENT DOCUMENTS

| | | | | |
|---|---|---|---|---|
| 9,477,279 | B1 * | 10/2016 | Piszczek | G06F 1/26 |
| 2006/0053250 | A1 * | 3/2006 | Saze | G06F 3/0608 |
| | | | | 711/114 |
| 2008/0256307 | A1 * | 10/2008 | Fujimoto | G06F 1/3203 |
| | | | | 711/154 |

(Continued)

OTHER PUBLICATIONS

Edward K. Lee & Chandramohan A. Thekkath, "Petal: Distributed Virtual Disks", Proceedings of the Seventh International Conference on Architectural Support for Programming Languages and Operating Systems (Oct. 1996), pp. 84-92.

(Continued)

*Primary Examiner* — Hong Kim
(74) *Attorney, Agent, or Firm* — Rosenberg, Klein & Lee

(57) ABSTRACT

Method and system for data migration between data generating entities and data storage devices protected by de-clustered RAID algorithm are enhanced by dynamically controlling the I/O activity towards the data storage devices (NVM devices) based on their remaining lifespan (health) with the goal to prevent multiple devices selected for writing a parity stripe information from simultaneous failures. This feature is rendered by polling the remaining health of NVM devices in the RAID pool, computing a weighted lifespan for each NVM device, comparing the latter to an average of all NVM devices in the pool, and adjusting the I/O activity towards the NVM device of interest accordingly. If the weighted lifespan exceeds the average lifespan in the pool, the allowed I/O activity is increased, and if the weighted lifespan is below the average for the pool, then the device in question is sent less "writes".

20 Claims, 8 Drawing Sheets

(56) References Cited

U.S. PATENT DOCUMENTS

2015/0269020 A1* 9/2015 Nakashima ......... G06F 11/3037
714/6.22

OTHER PUBLICATIONS

Mark Holland & Garth A. Gibson, "Parity Declustering for Continuous Operation in Redundant Disk Arrays", Proceedings of the Fifth International Conference on Architectural Support for Programming Languages and Operating Systems (Oct. 1992), pp. 23-35.

* cited by examiner

METHOD AND SYSTEM FOR DATA MIGRATION BETWEEN HIGH PERFORMANCE COMPUTING ENTITIES AND A DATA STORAGE SUPPORTED BY A DE-CLUSTERED RAID (DCR) ARCHITECTURE WITH I/O ACTIVITY DYNAMICALLY CONTROLLED BASED ON REMAINING HEALTH OF DATA STORAGE DEVICES

FIELD OF THE INVENTION

The present invention is directed to data migration between high performance computing cluster architecture (data generating entities) and data storage media. Particularly, the present invention relates to a data migration technique for selecting data storage devices from a pool of available data storage devices for being a part of a parity stripe by favoring data storage devices over others based on their remaining health or lifespan so that their End-of-Life (EOL) failures do not occur at the same time.

Further in particular, the present invention relates to a data storage system supported by redundant disk arrays architecture configured for parity de-clustering in which an I/O pattern issued to the Non-Volatile Memory (NVM) devices are dynamically controlled to prevent the likelihood of multiple NVM devices failure at close time intervals (or at the same time period), thereby preventing the system from potential data loss due to the simultaneous (or almost simultaneous) failure of multiple NVM devices before the maintenance window.

In overall concept, the present invention is directed to a data storage system and method enhanced by distributing data and parity across a pool of NVM devices in a dynamically controlled uneven manner in order to prevent the End-of-Life (EOL) failures of the NVM devices (included in a parity stripe) from occurring in the same time interval. This is attained by monitoring the remaining health (or remaining lifespan) of each NVM device included in the pool of interest, determining an expected number of bytes each of the NVM devices is permitted to write, comparing the expected number of bytes with an actual number of bytes written in each NVM device, and adjusting the I/O activity towards the NVM device of interest depending on the relationship between the expected number of bytes and actual number of bytes written, i.e., increasing the I/O activity for the NVM device of interest if the expected number of bytes exceeds the actual number of bytes, and decreasing the I/O activity towards the NVM device of interest if the expected number of bytes is lower than the actual number of bytes written into the NVM device of interest.

Further, the present invention relates to a de-clustered RAID (DCR) data storage organization dynamically forming a de-clustered RAID (DCR) pool (which may be a collection of NVM devices or a collection of Physical Disk Extents (PDEs)), to permit leveraging of a number of NVM devices for I/O operations, where each RAID stripe is striped at respective NVM devices (or PDEs) constituting a row, and where the de-clustered RAID algorithm selects NVM devices to be part of the RAID stripe based on the monitored expected life (also referred to herein as lifespan, or remaining health) of the NVM devices.

In addition, the present invention is directed to a data migration and storage system which performs RAID calculations on the random ingress data received from the data generating architecture prior to storing the data in NVM devices, where a parity (RAID) stripe (containing a predetermined number of data units and at least one parity unit computed for the data units) is distributed in redundant disk arrays in accordance with parity de-clustering principles. Each NVM device in a pool of NVM devices is given a different weight, so that some NVM devices are more favored for inclusion into the parity stripe than others based on the NVM devices remaining lifespan (or remaining health), i.e., the remaining lifespan of each NVM devices is periodically polled and compared with the average remaining lifespan of all NVM devices in the pool, and, depending on the comparison, the I/O activity towards the NVM device of interest is dynamically adjusted in order to prevent simultaneous (or close to simultaneous) failure of multiple NVM devices included in the pool.

BACKGROUND OF THE INVENTION

Computer clusters, or groups of linked computers, have been widely used to improve performance over that provided by a single computer, especially in extended computations, for example, involving simulations of complex physical phenomena, etc. Conventionally, in a computer cluster, computer nodes (also referred to herein as client nodes, or data generating entities) are linked by a high speed network which permits the sharing of the computer resources and memory.

Data transfers to or from the computer nodes are performed through the high speed network and are managed by additional computer devices, also referred to as File Servers. The File Servers file data from multiple computer nodes and assign a unique location for each fragment of a file in the overall File System. Typically, the data migrates from the File Servers to be stored on rotating media such as, for example, common disk drives arranged in storage disk arrays for storage and retrieval of large amount of data. Arrays of solid-state storage devices, such as Flash Memory, Phase Change Memory, Memristors, or other Non-Volatile Memory (NVM) storage units, are also broadly used in data storage systems.

Failures of computer components in the data storage systems usually follow the patterns depicted in FIG. 1 as a curve known as the "bathtub curve", which represents the life (or the lifespan) of a device. The first phase of the life, identified in FIG. 1 as an "Early Failures" region of the "bathtub" curve, generally has a high failure rate due to what is known as an infant mortality of the components. These are the failures which generally occur due to manufacturing defects that appear early in the life of the device when in use.

The middle phase, identified in FIG. 1 as a "Random Failures" region of the "bathtub" curve, represents the useful life of the device, and generally has a low failure rate, which typically occurs due to random defects.

The final phase of life identified in FIG. 1 as a "Wear-Out Failures" region of the "bathtub" curve, shows higher failure rates as the components fail due to wear-outs.

Current Non-Volatile Memory (NVM) devices, such as Flash, Memristor and Phase-Change Memory, have a limited life span and wear out with "write" usage. For example, typical Multi-Level Flash cells have approximately 7K-10K program/erase cycles before the cell cease to accurately retain data. Memristors and Phase-Change Memory devices have higher program/erase cycles, but are word addressable and typically are much faster, and are prone to wear-outs with "write" usage.

In order to prevent data loss, manufacturers of NVM devices implement various wear leveling algorithms inside the devices to ensure that the cells in an NVM device wear evenly across the entire NVM device. The known program/erase limit of the cells in the NVM devices in conjunction with the wear leveling algorithms serves as a tool permitting the lifespan of the NVM devices to be accurately predicted. The predicted lifespan of the NVM devices is reflected by a spike at the end of the failure rate curve for NVM devices shown in FIG. 2. While other components of data storage systems show a slowly increasing failure rate as the device begins to wear out, NVM devices fail much more abruptly after a predetermined amount of usage.

The lifespan of an NVM device is measured in program/erase cycles. The total number of program/erase cycles a device is capable of withstanding is the typical program/erase limit for a cell in the NVM device multiplied by the total number of cells in the device. FIG. 3 is representative of a relationship between a parameter known as a "remaining health" of an NVM device and the "age" of the device, i.e., the amount of program/erase cycles the device has gone through. The "remaining health" is expressed as an percent (integer) ranging from 0% to 100%, where "0%" corresponds to a state of a device having no remaining health (close to or at the failure state), and "100%" corresponds to a state of a fully healthy device. As can be seen in FIG. 3, the remaining health of an NVM device is high when the device is new, and decreases from 100% (for a new NVM device) to 0% (at the NVM device's End-of-Life stage).

The lifespan of a device is related to the number of bytes written to the device. One properly bounded "write" of an entire cell is equivalent to a single program/erase cycle. Non-bounded "writes" usually cause multiple program/erase cycles. This effect is known as write amplification which is an undesirable phenomenon associated with flash and solid-state drives. In write amplification, the actual amount of physical information written in the drive is a multiple of the logical amount intended to be written.

Wear leveling inside the NVM device causes write amplification because the NVM device transports data between cells causing additional program/erase cycles which shorten the life of the NVM device.

The multiplying effect increases the number of "writes" over the lifespan of the NVM devices which shortens the time the NVM device can reliably operate.

Knowing the lifespan of an NVM device makes the End-of-Life (EOL) of the NVM device easily predictable. Manufacturers of NVM devices use the EOL predictions to warn a user ahead of time that an NVM device of interest is approaching the End-of-Life stage.

As shown in FIG. 4, the End-of the-Warranty precedes the real End-of-Life of a device. The manufacturers usually report the End-of the-Warranty of the device as the End-of-Life. This is provided in order to warn a user beforehand, and to allow the user sufficient time to replace the device in question before the data loss occurs. Manufacturers often report the End-of-Life of a device when only less than 50% of the total allowed number of program/erase cycles have been reached.

The probability of data loss increases in NVM devices with the number of program/erase cycles performed to a cell (media) in the NVM device. Thus, by limiting the EOL to the End-of the-Warranty, manufacturers of NVM devices protect the integrity of the data at the cost of a reduced lifespan of NVM devices.

The probability of data loss may be reduced by using RAID algorithms to distribute data with parity across multiple devices. The main concept of the RAID is the ability to virtualize multiple drives (or other storage devices) in a single drive representation. A number of RAID schemes have evolved, each designed on the principles of aggregated storage space and data redundancy.

Most of the RAID schemes employ an error protection scheme called "parity" which is a widely used method in information technology to provide tolerance in a given set of data.

The data RAID algorithms typically stripe the data across N+P number of devices, where N is the number of chunks of data in the RAID stripe, and P corresponds to the parity data computed for the data channels in the RAID stripe.

For example, in the RAID-5 data structure, data is striped across the drives, with a dedicated parity block for each stripe. The parity blocks are computed by running the XOR comparison of each block of data in the stripe. Parity is responsible for data fault tolerance. In operation, if one disk fails, a new drive can be put in its place, and the RAID controller can rebuild the data automatically using the parity data.

Alternatively to the RAID-5 data structure, the RAID-6 scheme uses block-level striping with double distributed parity P1+P2, and thus provides fault tolerance from two drive failures. A system configured with the RAID-6 protection may continue to operate with up to two failed drives. This allows larger RAID groups to be more practical, especially for high availability systems.

With the introduction of de-clustered RAIDs organizations, virtual disks are dynamically created out of a large pool of available drives (members), where the number of members is larger than N+P, with the intent that a RAID rebuild will involve a large number of cooperating drives, and thus reduce the window of vulnerability for data loss. An added benefit is that random READ/WRITE I/O (Input/Output) performance is also improved.

A stripe of RAID data may be created by selecting chunks of free space on separate devices included in a pool. Members of the RAID stripe may be selected algorithmically or randomly depending on the sophistication of the de-clustered RAID algorithm. The goal of using a de-clustered RAID algorithm is to distribute the data across the devices evenly for maximum performance and latency.

Parity de-clustering for continued separation in redundant disk arrays has advanced the operation of data storage systems. The principles of parity de-clustering are known to those skilled in the art and presented, for example, in Edward K. Lee, et al., "Petal: Distributed Virtual Disks", published in the Proceedings of the Seventh International Conference on Architectural Support for Programming Languages and Operating Systems, 1996; and Mark Holland, et al., "Parity De-clustering for Continuous Operation in Redundant Disk Arrays", published in Proceedings of the Fifth Conference on Architectural Support for Programming Languages and Operating Systems, 1992.

In the data storage systems, the NVM devices have very predicable lifespan, and it has been found that multiple devices are likely to fail after a similar number of writes. Referring to FIG. 5, when all NVM devices in a data storage system have similar I/O workloads during their useful lives, all NVM devices are prone to failure substantially at the same time span, thus making the system vulnerable to data loss.

In the known de-clustered RAID protected data storage systems, members of a parity data stripe are chosen at random when a large chunk of data is requested to be written, i.e., these systems randomly select M+P number of data storage devices out of N data storage devices in the pool, where M corresponds to the number of data units, P corresponds to the number of parity units, and N>M+P.

If the RAID algorithm distributes the data evenly to all the memory devices randomly selected for the parity stripe, there is a high probability of multiple NVM devices failure in the parity stripe within the same time period, and thus the likelihood of potential data loss is very high.

It would be highly desirable to provide a data migration system protected with the de-clustered RAID algorithm where the simultaneous (or close to simultaneous) failures of multiple NVM devices are prevented.

SUMMARY OF THE INVENTION

It is therefore an object of the present invention to provide a data migration system and a method supported by a de-clustered RAID architecture where a dynamically controlled I/O activity towards NVM devices selected to be a part of a parity stripe is adjustably applied to NVM devices to slightly favor some NVM devices over others based on their remaining health to ensure that their EOL failures are spread over time with intervals sufficient to prevent data loss due to simultaneous failures of multiple NVM devices.

It is another object of the present invention to provide a data migration system and method where the de-clustered RAID algorithm factors in the "life expectancy" of the NVM devices when selecting devices to be a part of a RAID stripe, and where each NVM device in the pool of devices, is given a different weight so that some NVM devices are more favored than others for I/O activity.

It is a further object of the present invention to provide a data storage system and method configured for monitoring the remaining lifespan (also referred to herein as the remaining health) of the NVM devices, computing the weighted lifespan of each NVM device in the pool, comparing the weighted lifespan of each NVM device to an average remaining lifespan of the NVM devices in the pool and adjusting the I/O activity allowed towards the subject NVM device accordingly, i.e., if the weighted lifespan of the NVM device of interest is above the average of all the NVM devices in the pool, then the subject NVM device is sent more writes, and if the weighted lifespan of the device in question is below the average of all the devices in the pool, then the NVM device of interest is sent less writes.

In one aspect, the present invention is directed to a method for data migration in a data storage system enhanced by prevention from simultaneous (or close to simultaneous) failures of multiple data storage devices. The subject method is carried out through the following steps:

operatively coupling an I/O activity control sub-system between at least one data generating entity and a plurality of data storage devices, also referred to herein as a pool), operatively coupling a monitoring sub-system to each of the plurality of data storage devices, and monitoring the remaining health (or remaining lifespan) of each data storage device;

computing, by the I/O activity control sub-system, an average remaining health (or lifespan) for all data storage devices in the pool, comparing the remaining health of each data storage device with the average remaining health for all data storage devices in the pool; and dynamically adjusting I/O activity towards the data storage device of interest in accordance with results of the comparison between the remaining health of each data storage device of interest and the average remaining health of the data storage devices in the pool.

Specifically, when the remaining health of each data storage device exceeds the average remaining health for the entire pool of data storage devices, then the I/O activity towards the data storage device of interest is increased, and, when the average remaining lifespan (health) exceeds the remaining lifespan of the data storage device of interest, then the I/O activity towards the data storage device of interest is decreased.

The subject method continues through the steps of:

issuing, by at least one data generating entity, at least one respective I/O request (write request) for data migration between at least one data generating entity and respective data storage devices constituting the pool. The I/O request may include data units and Address(es) of the data storage device(s) of interest;

computing at least one parity unit associated with the data units included in the I/O request, and forming a parity stripe composed of the data units included in the I/O request and the at least one parity unit.

Subsequently, a routine of forming a de-clustered RAID (DCR) structure is performed, i.e., formulating a collection of data storage devices of interest (for writing the parity stripe) from their pool in accordance with the Addresses identified in the I/O request and based on their remaining lifespan, i.e., in forming the collection of the devices for writing the parity stripe information, the remaining health (lifespan) of the data storage devices is factored in, and the devices with the remaining lifespan exceeding the average remaining lifespan for the pool are selected.

The parity stripe is subsequently striped throughout at least a portion of the data storage devices in the formed collection.

The subject method is further carried out through the following steps:

configuring the I/O activity control sub-system to process the remaining lifespan (health) data for the data storage device(s) of interest (acquired by the monitoring sub-system) to obtain a total number of bytes written to the data storage device of interest with the write request directed thereto, sorting the data storage devices by the total number of bytes written thereto, constructing a list of the data storage devices disposed in a predetermined order, and assigning a respective order index in accordance with the total number of bytes written thereto, wherein the order index ranges between 0 and n−1, wherein n is the number of the data storage devices in the list.

Subsequently to the routine of constructing the list of the data storage devices sorted in accordance to the total number of bytes written thereto, for each data storage device of interest included in the list, the respective order index is multiplied by a predetermined spread constant percentage, and an expected number of bytes for writing in the data storage device of interest is computed.

Subsequent to the end of a predetermined time period, the I/O activity may be recalculated. A periodic recalculation of the sorted list is performed in order to change its contents and the order (weighting) of the data storage devices therein when needed.

The ordering (weighting) of the data storage devices in the sorting list may be computed by different data generating entities independently one from another. If the results of computation are in disagreement, the independently computed orderings are converged.

In another aspect, the present invention pertains to a system for data migration between data generating entities and data storage devices enhanced by the dynamic adjustment of I/O activity allowed for data storage devices for prevention from simultaneous multiple data storage devices failures.

The subject system is configured as the de-clustered Redundant Array of Independent Disks (RAID) architecture dynamically formed with at least a portion of the data storage devices in the pool.

The subject system includes:

a monitoring sub-system operatively coupled to a plurality of data storage devices to monitor the remaining lifespan (or remaining health) of each data storage device of interest included in a pool thereof, and an I/O activity control sub-system operatively coupled to the monitoring sub-system. The I/O activity control sub-system is configured to weight the remaining lifespan (or health) of the data storage device of interest relative to other data storage devices in the pool, and to adjust I/O activity towards the data storage device of interest responsive to the comparison results.

In the present system, the I/O activity control sub-system is also coupled to the RAID unit, at least one data generating entity, and the DCR architecture.

The RAID unit is configured for computing at least one parity unit associated with a number of data units included in I/O requests generated by the data generating entities, and for forming a parity stripe composed of the number of data units and the parity unit. The RAID unit stripes the parity stripe in the de-clustered RAID (DCR) architecture across a respective subset of respective data storage devices.

The I/O activity control sub-system includes a list constructing unit operatively coupled to the monitoring sub-system for obtaining a total number of bytes written with the I/O request to the data storage device of interest, as well as forming a list of the data storage devices, and further includes a sorting unit operatively coupled to the list constructing unit and configured for sorting the data storage devices contained in the list in an order corresponding to the total number of bytes written in each data storage device. In the sorted list, the data storage devices are each assigned an order index ranging between 0 and n−1, wherein n is the number of the data storage devices in the pool.

The I/O activity control sub-system also includes a multiplication unit operatively coupled to the sorting unit and configured to multiply the order index of the each data storage device contained in the list by a predetermined spread constant percentage, to compute an expected number of bytes for writing in the data storage device of interest. The expected number of bytes to be written is subtracted from the actual number of bytes written in the Subtraction Unit, and the I/O activity allowed towards each data storage device is adjusted to receive more of the I/O requests if the subtraction result is positive, and to receive less of the write I/O requests if the subtraction result is negative. The predetermined spread constant percentage determines a chronological spread between failures of data storage devices in the pool, and may range between 1% and 2%.

A random selector with a weighted output is used in the subject system to compute a table of values for each NVM device in the pool. Selection is made from the table of values of a device having a weighting falling in or closest to a predetermined value range for inclusion into the collection for a parity stripe distribution.

The subject system is also configured to dynamically recalculate the I/O activity towards the data storage devices subsequent to an elapsed predetermined time period or periodically.

These and other features and advantages of the present invention will become apparent after reading further description of the preferred embodiment(s) in conjunction with the accompanying Patent Drawings in the current Patent Application.

PREFERRED EMBODIMENT(S) OF THE PRESENT INVENTION

An important concept of the present system and method is to distribute data (D) and parity (P) across a pool of NVM devices in a dynamically controlled order (preferably in an uneven manner) to chronologically spread out End-of-Life (EOL) failures of NVM devices included in a parity stripe to prevent failures of multiple devices from occurring simultaneously before their maintenance window by favoring some NVM devices in the pool over others.

Figure 1:
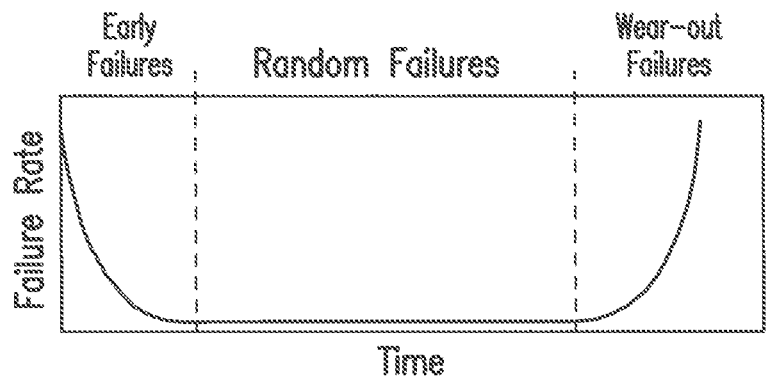
FIG. 1 is a diagram representative of the failure rates vs. usage time for NVM devices.
Figure 2:
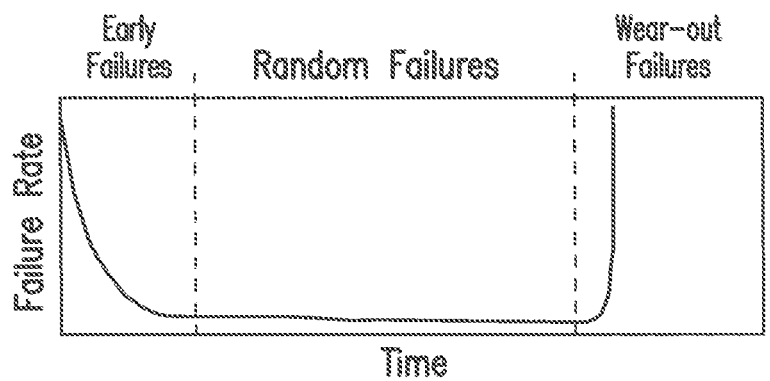
FIG. 2 is a diagram representing the failure rates vs. usage time for NVM devices based on lifespan predictions.
Figure 3:
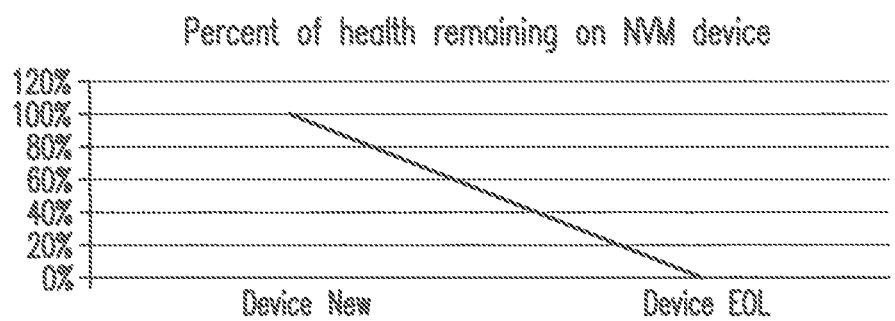
FIG. 3 is a diagram representative of percent of remaining health vs. usage age of NVM devices.
Figure 4:
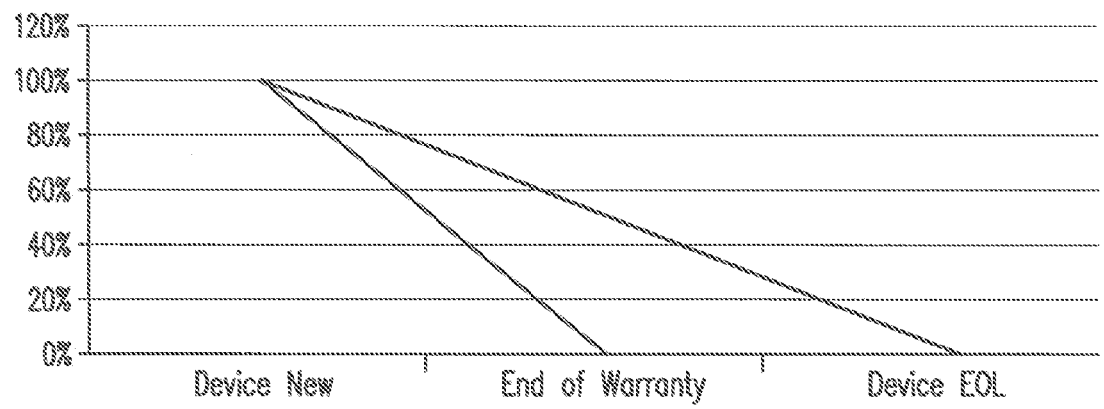
FIG. 4 is a diagram representative of the remaining health vs. usage age of NVM devices reflecting End-of the-Warranty given by manufacturers relative to the device EOL.
Figure 5:
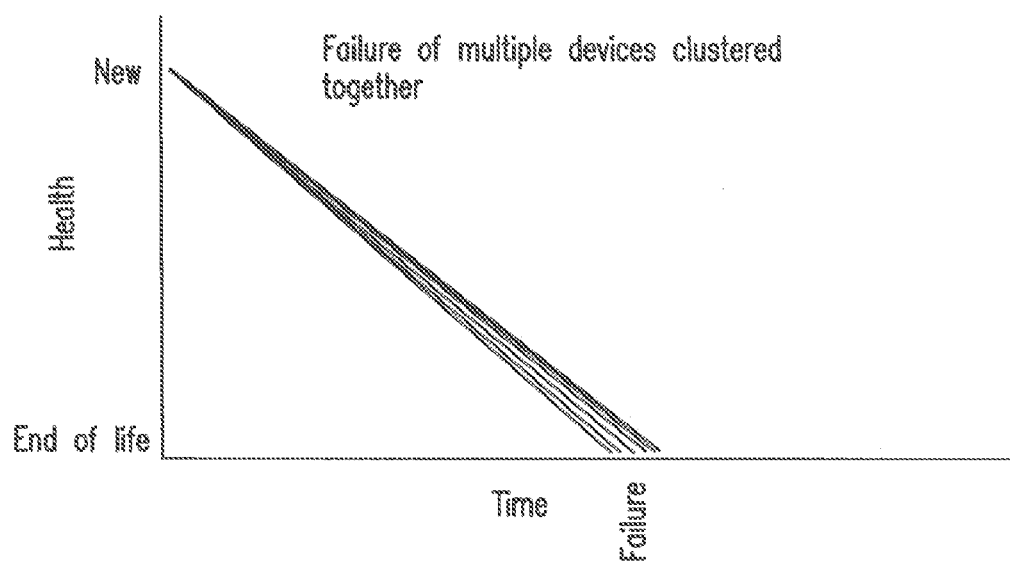
FIG. 5 is a diagram showing the situation when multiple devices fail within a time period close each to the other due to similar I/O workload during their useful life.
Figure 6:
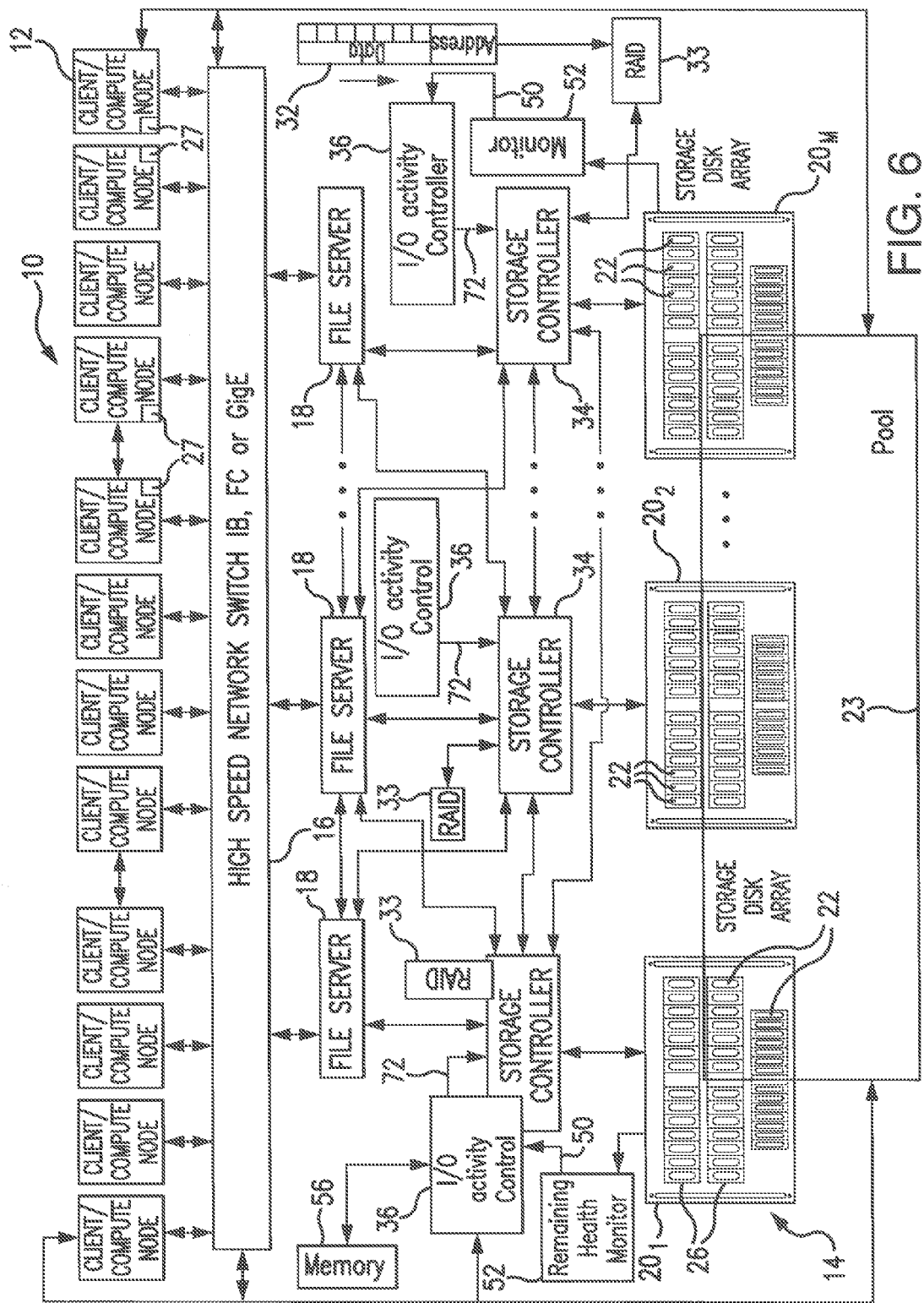
FIG. 6 is a block diagram of a subject data migration system.

FIG. 6 depicts an exemplary representation of the subject system 10 for data migration between Client Compute Nodes 12 and a storage sub-system 14 based, for example, on NVM devices, and supported by a de-clustered RAID (DCR) architecture. Numerous other implementations supporting the subject system and method for data migration between data generating entities and RAID storage devices are also contemplated in the scope of the present invention.

The compute nodes 12 may be arranged in computing groups, or computer clusters, to perform complex computations of various types. The operation of the compute nodes 12 depends on the system application. They may function as servers, supercomputing clusters, etc., and have the capacity to "write" by outputting data, as well as "read" from the storage sub-system 14, or an external memory, as well as any other device. In the present description the above-presented devices 12 will be intermittently referenced further as data generating entities.

The compute nodes 12 are connected through a High-Speed Network 16 to File Servers 18 which manage data migration from and to the compute nodes 12. The ratio of the compute nodes 12 to the File Servers 18 may be in excess of a thousand in some applications. The File Servers 18 may satisfy requests of the compute nodes 12 in the same order as the requests are received at the File Server. Therefore, the File Servers receive data from the compute node 12 in a random fashion.

During the input/output (I/O) cycle of the compute nodes operation, the data may be transferred from the compute nodes' cache to the File Servers which may place data in the File system for subsequent retrieval. The High Speed Network 16 functions as a high speed switch and may be based on any of the network transport protocols, such as, for example, Infiniband (IB), Fibre Channel (FC), Gigabit Ethernet (GigE), etc.

System 10 is capable of handling any type of data transfer. Data retrieved from the compute nodes 12, and/or File Servers 26 (combinably referred to herein also as data generating entities) is intended to be stored on disk drives 22 which may be arrayed in any format, shown, for example, as storage disk arrays $20_1, 20_2, \ldots, 20_M$. At least a portion of the arrayed disk drives 22 in the subject system forms a pool 23 of available disk drives 22, which may be dynamically changed, i.e., the inclusion of the disk drives 22 in the pool 23 may be changed based on system requirements, remaining lifespan of the disk drives, requests from data generating entities, etc.

The storage disk arrays $20_1, \ldots, 20_M$ may be arranged, for example, in the RAID (Redundant Array of Independent Drives) format. Each RAID storage disk array $20_1, 20_2, \ldots, 20_M$, is a multi-dimensional array of physical disk drives 22 distributed in Read/Write tier groups 26 for storing data D and parity values P (as well as Q) computed for the data stored in the array. Each tier group 26 in the array $20_1, 20_2, \ldots, 20_M$ constitutes a multiplicity of data disk storage channels.

In the present system, the RAID storage sub-system 14 preferably operates based on the principle of a de-clustered RAID storage in which the redundant disk arrays $20_1, 20_2, \ldots, 20_M$ include a plurality of data storage devices 22 (further referred to herein as physical disks, or PD), and the data D and parity values P, Q of parity stripes may be distributed across disk drives from different arrays.

The Physical Disks 22 in each array $20_1, 20_2, \ldots, 20_M$ may be of any type including traditional spinning disk drives, as well as solid state disks, such as flash memory, phase-change memory, Memristors, as well as fiber channel physical disks, or other Non-Volatile Memory (NVM) data storage carriers.

In addition, Physical Disk Extensions (PDEs), or SAS PDEs may be used as data storage structures, as will be detailed in further paragraphs. In this embodiment, the data D and parity values (P, Q) may be distributed across Physical Disk Extents (PDE) 24 of different Physical disks 22 (PD).

Figure 7:
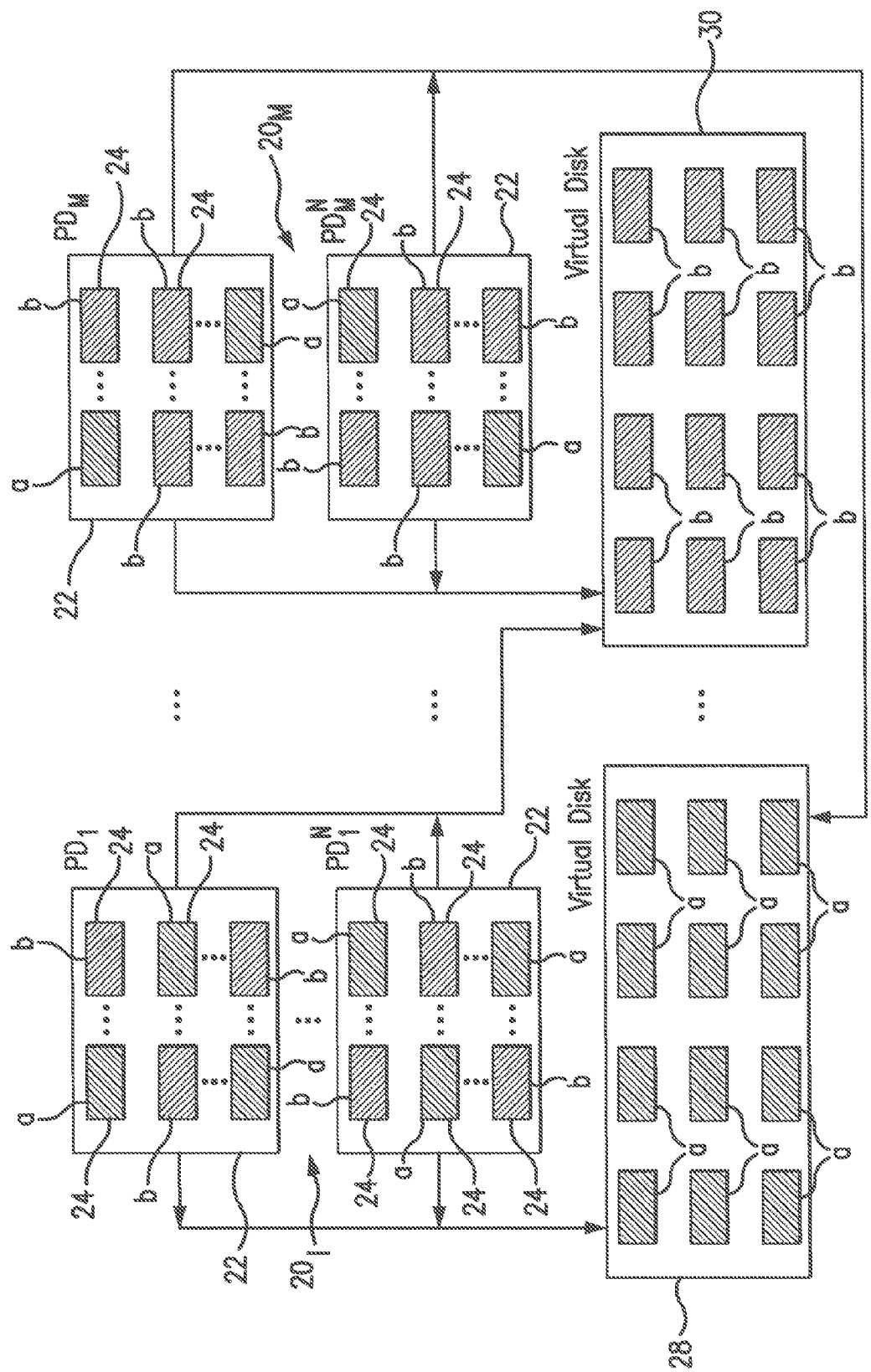
FIG. 7 is a schematic representation of an alternative arrangement using Physical Disk Extents (PDEs) for parity stripes distribution in the subject system.

Each PD 22 as presented in FIG. 7, contains a number of Physical Disk Extents (PDEs) 24. Normally, a physical disk has a certain memory size, for example, 2, 4, or 8 terabytes, which is divided into logical pieces called Physical Disk Extents, for example 8 gigabytes in size. Thus, each PD 22 may include, for example 1024 sections, or PDEs 24. The total number of PDEs 24 at different PDs 22 may differ one from another, but, preferably, their physical size is the same.

As depicted in FIG. 7, physical data storage disks $PD_1, PD_1^N$ cumulatively form the physical storage disk array $20_1$, while physical disks data storage $PD_M, PD_M^N$ form the storage disk array $20_M$.

One or more virtual disks, for example, virtual disks 28, 30, may be configured from PDEs 24 of the physical disks 22 presented in either of the storage disk arrays $20_1, 20_2, \ldots, 20_M$. For example, the PDEs "a" residing on the $PD_1, \ldots, PD_1^N$, and $PD_M, \ldots, PD_M^N$ are included in the virtual disk 20, while the PDEs "b" are included in the virtual disk 30.

The PDEs included in the same virtual disk may physically reside at any physical disk 22, and in any physical storage disk array $20_1, 20_2, \ldots, 20_M$. In some instances, the virtual disks 28, 30 partially overlap each with the other, i.e., contain at least one PDE included in both virtual disks 28, 30.

The inclusion of the PDEs in the specific virtual disks, as well as inclusion of the NVM devices 22 in the pool 23, may be dynamically changed as required by the data migration process. Each of the virtual disks 28, 30 formed in the present system reside on at least a portion of the plurality of physical disks 22 contained in any storage disk arrays $20_1, 20_2, \ldots, 20_M$. Similarly, in the system operating with entire NVM devices 22 (rather than PDEs 24), the pool 23 may include all or a portion of the disks 22 contained in any of the storage disk arrays $20_1, 20_2, \ldots, 20_M$.

When operating with entire NVM devices, the data generating entities view the disk drives 22 in the pool 23 and identify these by their physical address.

Alternatively, when operating in the PDE environment, the data generating entities 12 do not view the physical disks 22, and do not identify the PDEs 24 by their physical addresses associated with the corresponding Physical Disks. In the present system, each data generating entity 12 can "view" the data storage sub-system 14 as a pool of virtual disks 28, 30 with each PDE 24 identified by its Logical Block Address (LBA). Logical Block Address is a part of a linear addressing scheme where blocks are located by an integer index, with the first block, for example, being $LBA_0$, the second block being $LBA_1$, etc. As known to those skilled in the art, in the Logical Block Addressing, typically only one number is used to address data, and each linear base address describes a single block. The LBA scheme replaces schemes which expose the physical details of the storage to the software of the operating system. In the virtual disks 28 and 30, each PDE 24 has a specific LBA where the data generating entities indicate in their requests when I/O activity is desired.

Each compute node 12 has a software unit 27 (shown in FIG. 6) which controls the operation of the respective compute node for the intended purposes and allocates I/O cycles during the execution of the compute node process.

When a specific data generating entity 12 issues I/O request 32, which may be of different nature, for example, a "write" request, the request 32 is sent through the High Speed Network switch 16 to a disk drive 22 of interest whose physical address is included in the I/O request. Alternatively, when the system uses the PDE-based virtual Disks, the request 32 is sent to a PDE 24 of interest whose LBA is included in the request 32.

During operation, a virtualized RAID unit 33 (shown in FIG. 6) applies RAID calculations to data ingress from a data generating entity prior to "writing" the data in disk drive 22 (or the PDEs 24) of interest. As a part of the RAID calculations, parity values are calculated for the ingress data. Space in the data storage devices (or specific PDEs) for the parity values is allocated for example by the RAID unit, or by a storage controller, or by the data generating entity issuing the "write" request 32. Data may be interleaved in stripe units distributed with parity information across a specific sequence of the disk drive 22 (or a specific sequence of PD:PDEs), both of which can be dynamically changed at the request on data generating entities.

In a pool 23 including N data storage devices, the system dynamically selects (M+P) NVM devices to be a part of a parity stripe, where M is the number of data units in the "write" request 32, and P is the number of parity units (chunks) computed by the RAID unit 33. The present system selects the number (M+P) of NVM devices 22, and then selects a free region (i.e., PDE 24) on each NVM device to form a parity stripe to store data and parity information. In the present system, some NVM devices 22 of the pool 23 are favored over the others for forming the parity stripe based on their remaining health with the purpose of preventing the NVM devices included in the parity stripe from wearing out at the same rate.

The sequence of the disk drives for parity stripes distribution may be dynamically changed in the subject system based on their remaining health, as will be presented in following paragraphs. The parity scheme in the RAID may utilize either a two-dimensional XOR algorithm or a Reed-Solomon Code in a P+Q redundancy scheme.

The RAID unit 33 may perform data reconstruction when "read" requests are serviced when corrupted or lost data is found. The parity values are used to reconstruct the data during "read" operations.

A number of storage controllers 34 are included in the structure. As shown in the exemplary implementation of the subject system 10 depicted in FIG. 6, each storage controller 34 may be operatively coupled between the client compute nodes 12 and a respective storage disk array $20_1, 20_2, \ldots, 20_M$ for controlling data migration to and from the respective disk array, or to and from the disk drives of the pool 23, or alternatively, to and from the PDEs 24.

As an example only, but not to limit the scope of protection of the present invention to the specific implementation, the subject system will be presented further herein with the physical disks 22 implemented as NVM devices, referred to herein also as disk drives. However, any other memory storage media is also contemplated in the scope of the present invention. Although being configured for operation in a PDs and/or PDEs environment, as an example, the following description will be referenced to the PDs-based operation.

The RAID unit 33, in an exemplary implementation, may reside in a respective Storage Controller 34 in operative connection to the data generating entities 12. However, alternative implementations supporting the RAID engine functionality in the present system are also contemplated. These may include, for example, a centralized RAID engine, etc.

A specific connection between each storage controller and the corresponding storage disk array, shown in FIG. 6, is only an example of numerous other implementations of operative interconnection between the storage controller(s) 34 and the data storage sub-system 14 contemplated in the present data migration system. For example, all storage controllers may be configured to perform identical functions and be interchangeable. Alternatively, one of the storage controllers may be appointed (for example, by a host) to perform parity calculations, while other storage controllers may be "tasked' to perform the role of the data storage controllers in accordance with the size and type of the "write" (or "read") data passing through the data channels, etc. Additionally, a specific function of the storage controllers, their number in the system, as well as the number (and collection) of the Physical Drives (and/or PDEs) controlled by a specific Storage controller may be adaptively defined, as needed, for servicing a specific "write" and/or "read" request 32.

Figure 8:
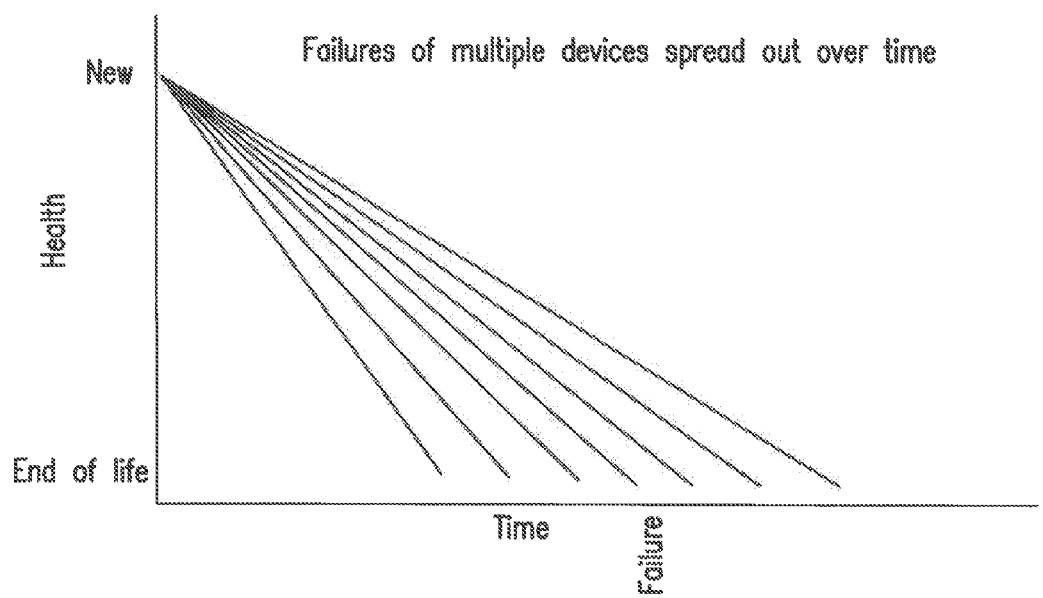
FIG. 8 is a diagram showing multiple devices failing at different time periods allowing more time for maintenance windows in between failures attained in the subject system.

Storage controller 34 controls the operation of the disks 22 in the corresponding disk arrays $20_1, 20_2, \ldots, 20_M$. In the present system, the disk drives 22 are accessed in an optimally efficient manner for preventing failure of multiple disk drives (or NVM devices) at the same time (or chronologically close each to the other) before the maintenance window. FIG. 8 depicts the spread of failures of NVM devices attained in the subject system 10.

The capability of executing a specific dynamically controlled I/O pattern in a preferred, i.e., uneven, manner in the system 10 is provided by utilizing an I/O activity control sub-system 36 which may be centralized, or operatively coupled between the data generating entity 12 and a respective storage controller 34, or in some implementations, may reside on the storage controller 34 or on the client/compute node 12. The specifics of the I/O activity control sub-system 36 will be presented further herein in conjunction with FIGS. 9A-9B.

The I/O activity control sub-system 36 is configured to provide a regime of operation for the NVM devices 22 in which the EOL (failure) of each NVM device included in a parity stripe occurs at a different time with a time interval between failures of the NVM devices sufficient to undertake necessary measures to prevent data loss, i.e., to allow time for maintenance windows between the failures of NVM devices 22.

The I/O activity control sub-system 36 operates to weight the remaining life span of the NVM devices, and to apply and dynamically control I/O activity (usage) pattern which in the present system is adjusted responsive to the weighted remaining health state of each NVM device monitored (continually or periodically) to prevent simultaneous failure of multiple NVM devices. Thus, the system favors some NVM devices (with a higher weighting) in the pool 23 over the others, so that NVM devices selected for writing the parity stripe do not wear out at the same rate.

The present system is equipped with a monitoring (Remaining Health Monitor) sub-system 52 operatively coupled to the pool 23, and specifically, to each disk drive 22 included in the pool 23. The monitoring sub-system 52 is configured to monitor the remaining health (or remaining lifespan) of each NVM device 22, as will be presented in following paragraphs.

A parameter corresponding to the remaining health (or lifespan) of each disk drive 22 of interest is fed to the I/O activity control sub-system 36 for weighting the remaining health of the NVM device of interest, and subsequent adjustment of I/O activity allowed towards the NVM device of interest.

The monitoring sub-system 52, in one implementation, may use the SMART system (also S.M.A.R.T.), which stands for Self-Monitoring, Analysis and Reporting Technology. SMART is an industry standard reliability prediction indicator for both IDE/ATA, SCSI and NVMe (NVM Express) storage drives. The SMART system is embedded in the monitoring sub-system 52 in the subject system 10, and is operatively coupled between each NVM device 22 and the I/O activity control sub-system 36.

Figure 9A:
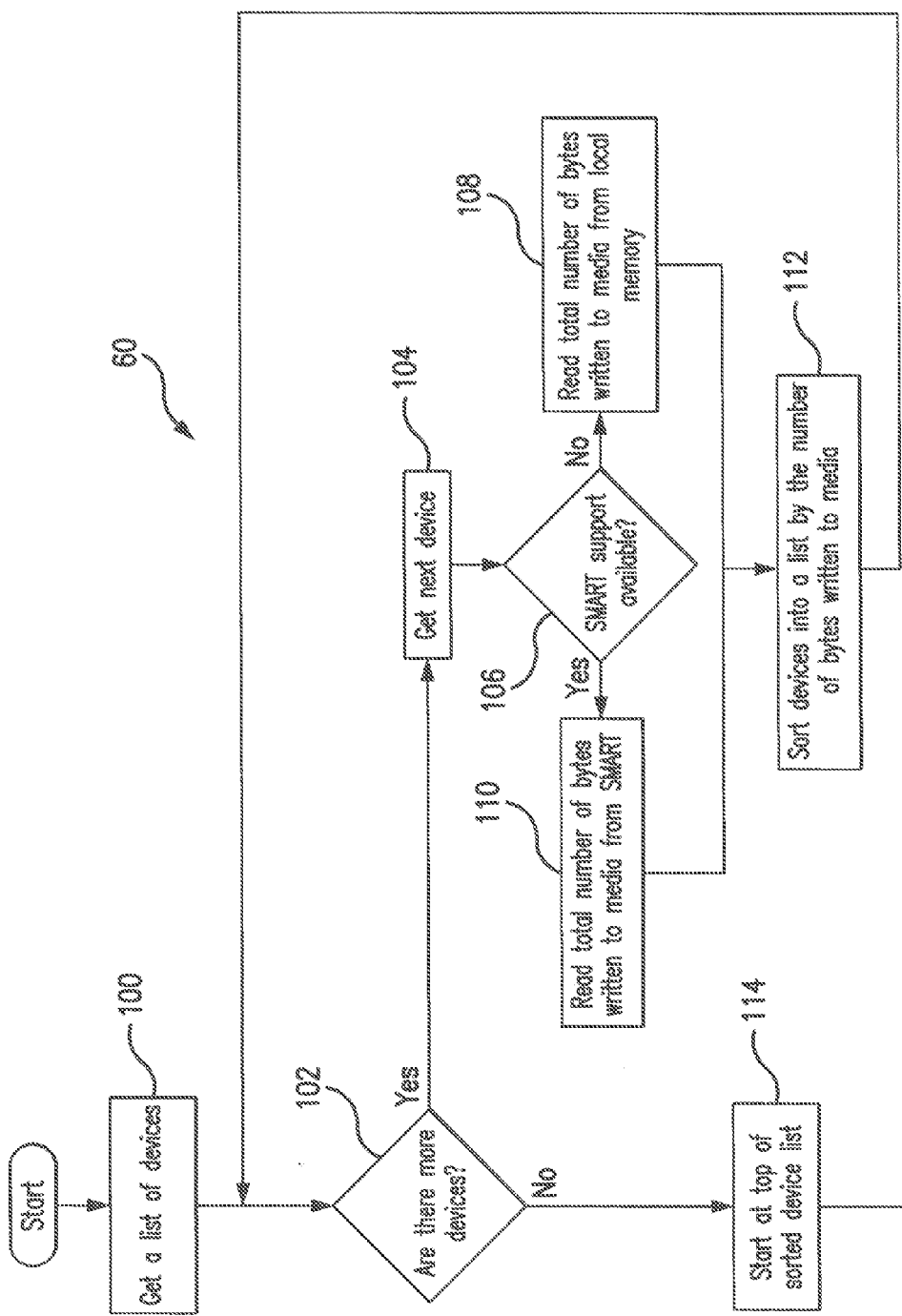
FIG. 9A is a flow-chart diagram of a procedure for the I/O activity control embedded in the subject data migration system.
Figure 9A:
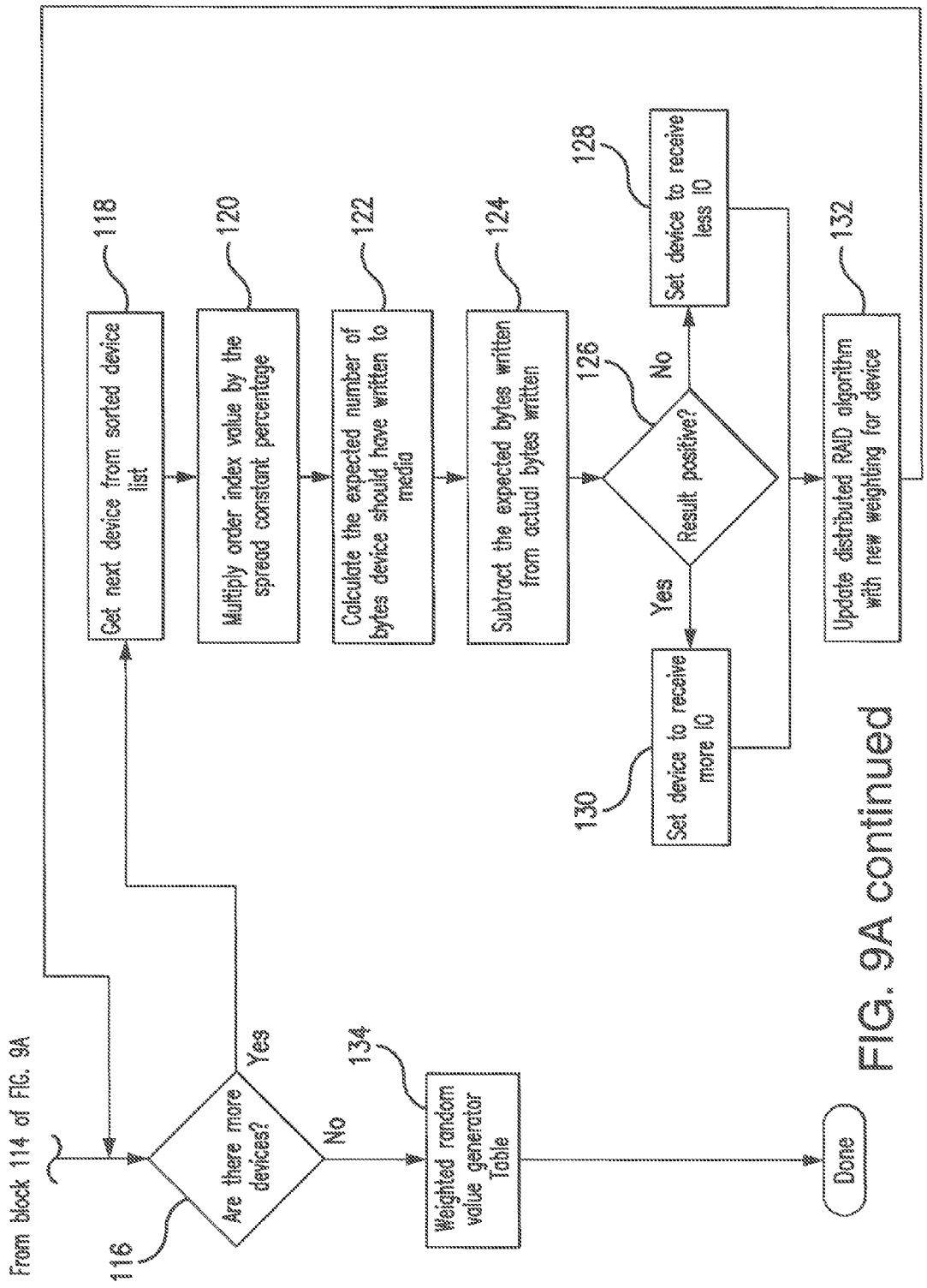
Figure 9B:
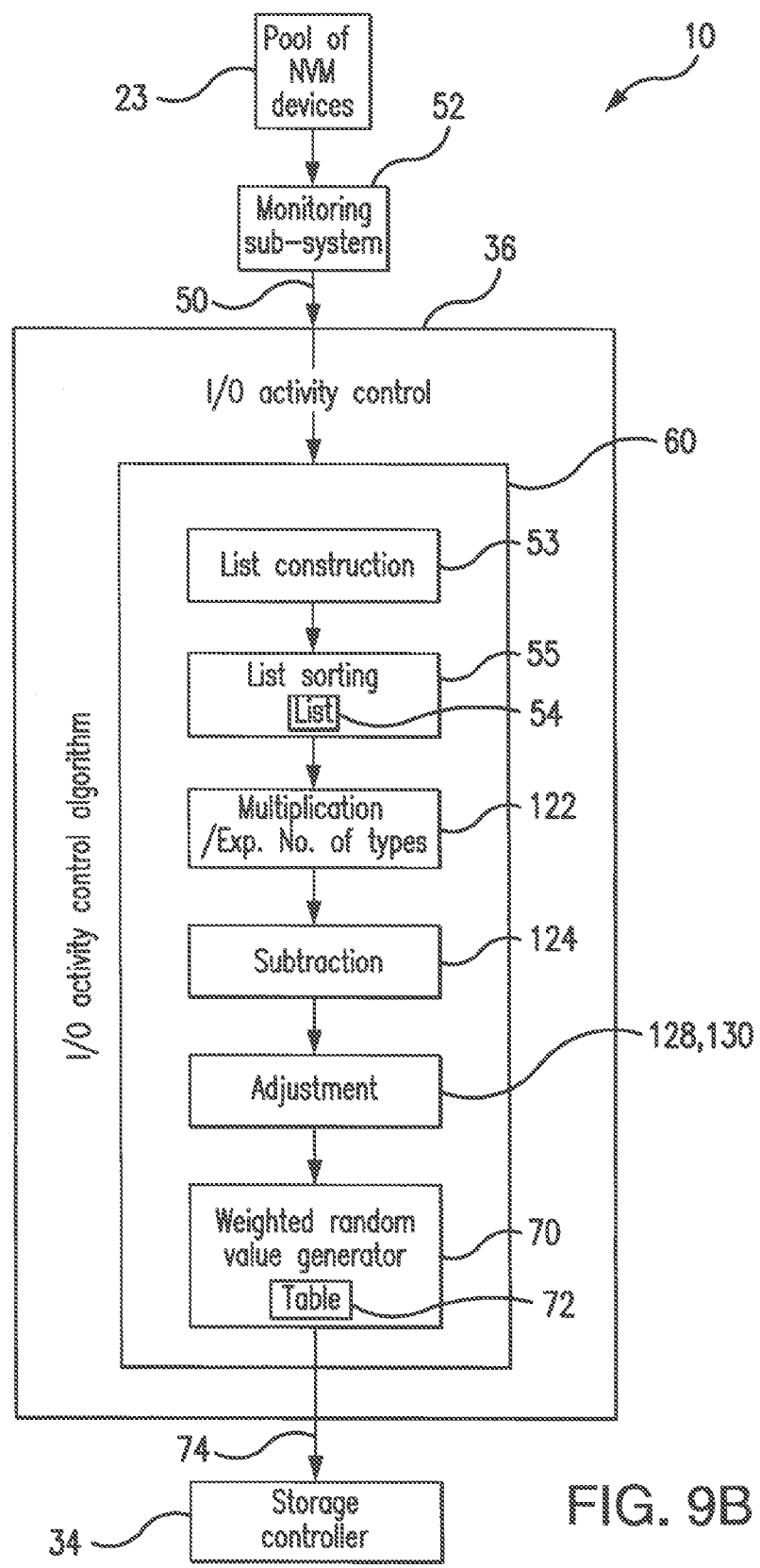
FIG. 9B is a simplified illustration of operation of the subject I/O activity control sub-system.

Referring to FIGS. 6 and 9A-9B, in order to stagger the failures of the NVM devices selected for writing a parity stripe, the remaining health of each NVM device 22 in the pool is monitored (periodically or continually), and the SMART data 50 acquired by the monitoring sub-system 52 from the NVM devices 22 is fed to the I/O activity control sub-system 36.

The SMART data 50 corresponds to the remaining health of each monitored disk drive 22. It is presented as an integer ranging between "0" and "100" where "0" is representative of the state of the disk drive having no remaining health (i.e., EOC), and "100" is representative of the state of the monitored device which is fully healthy. SMART data 50 also contains a total number of bytes written to the NVM device of interest.

As shown in FIG. 9B, in the I/O activity control sub-system 36, upon data 50 are acquired from the SMART (monitoring) sub-system 52, a list construction unit 53 forms a list of the NVM devices 22 included in the RAID pool 23 which are subsequently sorted into a sorted list 54 in the List sorting unit 55 based on their remaining health data.

The sorted list 54 may be stored in a local memory 56. The local memory 56 may reside in the CPU (not shown) that manages and controls the operation of the subject system 10.

The order of the NVM devices in the sorted list 54 is used to determine a number of expected bytes written. The expected bytes written are subsequently compared to the number of actual bytes written. The results of comparison are used to dynamically adjust the I/O activity allowed towards the NVM device of interest, i.e., to increase or decrease the level of I/O activity, and thus favoring some NVM devices in the sorted list 54 over the others for inclusion in the collection for writing a parity stripe for the I/O request 32. This prevents all NVM devices in the collection from wearing out at the same rate. The results of adjustment may be transmitted to the storage controller(s) 34 to execute the adjustment of the allowed I/O activity towards respective NVM devices when selecting for the parity stripe distribution.

The principles of the operation of the I/O activity control sub-system 36 supported by the algorithm 60 are also applicable in the PDEs environment as long as all PDEs 24 of the same NVM device 22 share the same SMART values.

Referring to FIGS. 6 and 9A, the algorithm 60 underlying the operation of the I/O activity control sub-system 36 is initiated in block 100, where a list of NVM devices included in the RAID pool 23 is built, and the logic flows to block 102 "Are there more devices?". If there are more devices in the RAID pool, the logic flows to block 104 "Get next device", and questions (in block 106) whether the SMART support is available. If the SMART support is available, i.e., the monitoring sub-system 52 uses the operating SMART technology, the logic advances to step 110 "Read Total Number of Bytes Written to Media from SMART". This value includes wear leveling and write amplification effects.

If however in decision block 106 the logic decides that the SMART support is not available, step 108 is performed, where total number of bytes written to media is read from the local memory 56. In this step, the monitoring sub-system 52 uses the logic embedded in each NVM device which tracks the writes to each NVM device in the memory unit 56, and saves to a reserved section of the NVM device periodically. One or more blocks in the NVM space are reserved for this purpose.

During operation, each NVM device saves the count of bytes written to the device, and the bytes that the device has written to the NVM media. The media here refers to the NVM, such as, for example, the flash portion of the NVM device. The number of bytes written to the NVM (media) will always be greater than or equal to the bytes written to the NVM device due to the fact that the NVM device performs extra writes to the NVM (media) for internal operations, such as, for example, error recovery, wear leveling, and its own recordkeeping. The ratio of these two counts, i.e., bytes written to the NVM media and bytes written to the NVM device, is called write amplification, which may be presented as:

$$\text{Write amplification} = (\text{number of bytes written to the NVM media})/(\text{number of bytes written to the NVM device}) \quad \text{(Eq. 1)}$$

Both these numbers (i.e., the number of bytes written to the NVM media, and the number of bytes written to the NVM device) refer to the actual bytes written.

From blocks 108 and 110, the logic flows to block 112 "Sort Devices into a List by a Number of Bytes Written to Media". In this step, the NVM devices contained in the RAID pool 23 are sorted into the sorted list 54 based on their remaining health obtained either in step 108 or in step 110.

The sorted list 54 has an order index assigned to each NVM device ranging from 0 to N−1, where N is the total number of members (NVM devices) in the RAID pool 23. The device with the highest number of bytes written to media will likely fail first, and thus is assigned an order index of 0. The device with the lowest bytes written to NVM media will likely fail less and is assigned an order index of N−1, where N is the number of members in the RAID pool 23.

The logic performs procedure of steps 104, 108, 110, 106 and 112 for all NVM devices included in the RAID pool 23 until the number of NVM devices in the RAID pool is exhausted.

If in logic block 102 it is decided that there are no more devices in the RAID pool 23 to process, the procedure flows to step 114 "Start at Top of Sorted Device List", and moves to logic block 116 to decide whether there are more devices.

If there are more devices, the logic advances to the step 118 "Get Next Device from Sorted Device List", and for each device included in the sorted List 54, the step 120 "Multiply the order index value by the spread constant percentage" is performed. For each NVM device, the order index value of each device is multiplied by a predetermined spread constant percentage such as, for example, 1% or 2%. The spread constant percentage determines the spread between the time instances when the NVM devices are likely to fail. A larger value of the spread constant percentage increases the time between the expected failure of the NVM device of interest.

After the multiplication in step 120 is performed for each device in the RAID pool, the logic advances to step 122, where for each NVM device, the expected number of bytes which should have been written to the media is calculated. This routine is performed in step 120 by multiplying the maximum number of media bytes written to the NVM device at the order index 0 by (1−the spread constant value). The equation used in step 122 for calculation is expressed as:

$$\text{Expected bytes written} = \text{max bytes of all devices} \times (1 - (\text{spread constant} \times \text{order index})) \quad \text{(Eq. 2)}$$

The calculations by Eq. 2 result in the expected bytes written to the NVM media for the NVM device of interest.

Upon calculation of the expected number of bytes which the NVM device can write to its NVM media, the logic flows to step 124 where for each NVM device, the expected number of bytes written to the NVM media is subtracted from the actual bytes written to the NVM media.

A positive value indicates the NVM device should receive more writes. A negative value indicates the NVM device should receive less writes. The result of subtraction computed in step 124 is provided to logic block 126 where it is decided whether the result of subtraction is positive. If the result of subtraction is positive, the logic moves to block 130 to set the NVM device of interest to receive more I/O activity. Otherwise, the logic flows to block 128 to adjust the I/O activity towards the NVM device of interest for the smaller I/O activity. This way, some of the NVM devices in the pool are favored over the others for inclusion in the collection to be a part of a parity stripe for an I/O request 32. The process for NVM devices selection will be presented in detail further herein.

From blocks 128 and 130, the logic flows to block 132 "Update Distributed RAID algorithm with new weighting for device", where after a predetermined time period has elapsed, the steps to recalculate new I/O weightings for the NVM devices are repeated.

The subject method allows the weight of the "writes" to the NVM devices to be controlled dynamically. The list 54 is periodically recalculated after a specified time interval, such as, for example, an hour. This allows members of the RAID pool of the NVM devices to change their ordering if other factors (such as, for example, availability or latency) affect the predicted health of the devices.

The subject method permits older members in the RAID pool 23 to be replaced with new members that have better health characteristics. New members would automatically have a higher weighting than older members and would be used more often.

After some of NVM devices fail, they are replaced with healthier (or new) ones. The logic will correctly handle the replacement procedure. If a failed NVM device is replaced with a new NVM device, the system will automatically favor the new NVM device. The total "writes" to the new NVM device would be substantially lower than to other NVM devices, so it will be weighted the strongest NVM device.

In blocks 128 and 130, the data (results of subtraction calculated in block 124) is used to increase or decrease the I/O activity to the NVM device of interest for a predetermined period of time.

When it is decided in logic block 116 that no more devices remain in the sorted devices list 54, the process flows to block 134 "Weighted Random Value Generator Table".

There are a number of ways available to select (and favor) the NVM devices for participation in a parity stripe information writing. The subject method may adapt any of them. As an example only, but not to limit the scope of the present invention only to this particular implementation, the subject system and method may use a random selector with a weighted output (Weighted Random Value Generator) 70 shown in FIGS. 9A-9B, subsequently to the routine performed in the logic steps 128 and 130, and upon exhausting the NVM devices in logic block 116.

The selection process may be carried out through the steps of:

(1) creating a Table of values 72 for each NVM devices in the pool 23, (2) generating a random value R, (3) performing a modulus on the random value R by a largest value in the table of values plus 1, and (4) searching for the NVM device in the Table that has that value in this range of interest.

The subject system creates a Table of values 72 for each of N devices 22 included in the pool. In Table 72, each NVM device has a base probability weight of B, an adjustment A to the base probability weight (A is output upon completion of steps 128, 130 of FIGS. 9A-9B), and a spread constant C.

The base probability weight B is a constant that is the same for all devices, that is selected beforehand after tuning the system. C is the spread constant and is also a constant for all devices. B and C are chosen in the subject system and processed together so that their ratio determines the granularity of the output 74 of the weighted probability generator 70.

For the adjustment (A) to the base probability weight (B) for each device, block 130 adds 1 to A for a device, while block 128 subtracts 1 from A for the device.

The base probability weight B is used to fine tune the weighted random generator 70. The base probability weight (B) determines the granularity of the output and the ratio between the base probability weight, and the spread constant (C) determines how much the adjustment should change the probability.

Specifically, assuming that the base probability (B) is 100 and the spread constant (C) is 0.5, an example of a table of adjustments to the base probability (B) created by the subject system is presented as Table 1.

TABLE 1

| -4 | -3 | -2 | -1 | 0 | +1 | +2 | +3 | +4 | +5 |
|---|---|---|---|---|---|---|---|---|---|

In the example, B=100 is chosen as the base probability weight because it is easy to consider the probability of selecting each device as about 100 percent. So, considering B=100. C=0.5 and A=1, a weighted probability B for NVM devices would be 100.5, or a 0.5 percent increase in the probability for the data storage device of being selected for the parity stripe writing.

The weighted value W of each NVM device is computed as:

$$W = N + (A \times C) \qquad (Eq.\ 3)$$

Subsequently to calculating the weighted value W of each device, it is summited with the weighted values of the previous devices in the Table of values 72.

The results of calculations for each device (parameterized form of $W=N+(A \times C)$) are presented in Table 2.

TABLE 2

| N −4C | N −3C | N −2C | N −1C | N +0C |
|---|---|---|---|---|
| N +1C | N +2C | N +3C | N +4C | N +5C |

Weighed values for each device are presented in Table 3.

TABLE 3

| 98.0 | 98.5 | 99.0 | 99.5 | 100 | 100.5 | 101.0 | 101.5 | 102.0 | 102.5 |
|---|---|---|---|---|---|---|---|---|---|

Sum of weighted values ($WV[i] = \Sigma_{j=0}^{i} WV[j]$) for the NVM devices in the RAID pool are presented in Table 4.

TABLE 4

| 98.0 | 196.5 | 295.0 | 395.0 | 495.0 | 595.0 | 696.5 | 798.0 | 900.0 | 1002.5 |
|---|---|---|---|---|---|---|---|---|---|

Subsequently, each device weighted value is multiplied by a large constant X and the result of multiplication is converted to an integer to remove decimal points. X should be at least an order of magnitude larger than C. For example, this results in a Table 5 of integers, where the weighted values are multiplied by 10 and round (or floor) to integers.

TABLE 5

| 980 | 1965 | 2950 | 3950 | 4950 | 5950 | 6965 | 7980 | 9000 | 10025 |
|---|---|---|---|---|---|---|---|---|---|

In the step (2), a random value R is generated for example, R=113537. Subsequently, in step (3), the modulus of the random value R is taken by the largest weighed value in the device Table 72 plus 1. This results in a random value that will always fall in the range of the Table 5. A modulus is performed on the R=113537, and the largest value in Table 5+1 (i.e., mod it by 10025+1), that results in 3251. Subsequently, in step (4), a search is performed through the Table 5 to find the device that has the value in this range.

Through a binary search, the smallest value that is less than or equal to 3251 is found. In the Table 5, the value of the index position 4 (3950) satisfies this requirement, and the position 4 is selected for inclusion into a collection for the parity stripe writing.

The subject system and method is also applicable in a de-clustered network level RAID system with multiple hosts. Each host may calculate the weightings of the NVM devices independently. The hosts may not always agree on the exact same ordering but they would converge on the same device weights as the NVM devices are used.

The subject system is configured to select the NVM devices in the RAID pool 23 based on their remaining health. The I/O activity control sub-system operates to automatically ensure that the remaining health of the NVM devices selected for inclusion in the RAID pool is in the "working" range, i.e., prior to the EOL of the NVM devices.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A method for data migration in a data storage system enhanced by prevention from multiple data storage devices simultaneous failures, including:
    (a) forming a pool of data storage devices, and operatively coupling at least one data generating entity to said pool of data storage devices;
    (b) operatively coupling a monitoring sub-system to each data storage device in said pool, and monitoring remaining lifespan of said each data storage device;
    (c) operatively coupling an Input/Output (I/O) activity control sub-system between said monitoring sub-system and said each data storage device in said pool thereof;
    (d) processing, by said I/O activity control sub-system, data acquired by said monitoring sub-system and corresponding to said remaining health of said each data storage device, and assigning said each data storage device a corresponding weighted lifespan relative to a cumulative remaining lifespan of the data storage devices in said pool, comparing said corresponding weighted lifespan of said each data storage device with said cumulative remaining lifespan for the data storage devices in said pool; and
    (e) dynamically adjusting said I/O activity towards said each data storage device based on results of comparison obtained in said step (d), wherein, when said corresponding weighted remaining lifespan of said each data storage device exceeds said cumulative remaining lifespan, then the I/O activity towards said each data storage device is increased, and wherein, when said cumulative remaining lifespan exceeds said corresponding weighted remaining lifespan of said each data storage device, then the I/O activity towards said each data storage device is decreased.

2. The method of claim 1, further comprising the steps of:
subsequent to said step (a),
    (f) operatively coupling a Redundant Array of Independent Disks (RAID) computing unit between said at least one data generating entity and said pool of data storage devices, and forming a de-clustered Redundant Array of Independent Disks (DCR) structure containing said pool of data storage devices;
    (g) issuing, by said at least one data generating entity, at least one respective I/O request for data migration between said at least one data generating entity and respective data storage devices in said pool thereof, wherein said at least one respective I/O request includes data units and an address of said each data storage device of interest;
    (h) computing, in said RAID unit, at least one parity unit associated with said data units included in said at least one I/O request, and forming a parity stripe composed of said data units and said at least one parity unit;
    in said DCR structure, formulating a collection of data storage devices of interest from said pool thereof in accordance with said corresponding weighted remaining lifespans computed in said step (d); and
    (k) striping said parity stripe throughout at least a portion of said data storage devices in said collection thereof.

3. The method of claim 2, further comprising the step of:
    in said step (i), formulating said collection from said data storage devices assigned said corresponding weighted remaining lifespans exceeding said cumulative remaining lifespan of said pool.

4. The method of claim 2, wherein said at least one I/O request is a write request, further comprising the step of:
    in said step (i), formulating said collection in accordance with said address identified in said at least one write request.

5. The method of claim 1 further comprising the step of:
    in said step (d), calculating said cumulative remaining lifespan as an average remaining lifespan for all data storage devices forming said pool.

6. The method of claim 4, further comprising the steps of:
    in said step (c), configuring said I/O activity control sub-system to process said monitored remaining lifespan for said each data storage device to obtain in said step (d) total number of bytes written to said each data storage device with said at least one I/O request directed thereto,
    constructing a list of said data storage devices in said pool thereof,
    sorting said data storage devices by the total number of bytes written thereto in a predetermined order, and
    assigning a respective order index to said each data storage device in accordance with said total number of bytes written thereto, wherein said order index ranges between 0 and N−1, where N is the number of said data storage devices in said pool.

7. The method of claim 6, further comprising the steps of:
    subsequently to the step of constructing said list containing said data storage devices sorted in accordance with said total number of bytes written thereto, for said each data storage device included in said list, multiplying said respective order index by a predetermined spread constant percentage, wherein said predetermined spread constant percentage determines a chronological spread between failures of data storage devices in said pool thereof, and computing an expected number of bytes for writing in said each data storage device.

8. The method of claim 7, wherein said expected number of bytes written is computed as Expected number of bytes to be written=max bytes of all devices×[1−(predetermined spread constant percentage×order index)].

9. The method of claim 8, further comprising the steps of:

in said step (d), for said each data storage device, subtracting said expected number of bytes to be written from said actual number of bytes written acquired in said step (b), and in said step (e), adjusting the I/O activity towards said each data storage device to receive more of said I/O requests if said subtraction results is positive, and to receive less of said I/O requests if said subtraction result is negative.

10. The method of claim 9, further comprising the steps of:

subsequent to an elapsed predetermined time period, repeating said steps (b), (d), and (e) in sequence to dynamically recalculate adjustment to said I/O activity.

11. The method of claim 6, further comprising the step of:

periodically recalculating said list to change its contents and the order of said data storage devices therein.

12. The method of claim 9, further comprising the steps of:

in said step (a), operatively coupling a plurality of said data generating entities to said plurality of physical data storage devices, in said step (d), independently computing said ordering of the data storage devices in said data generating entities, and converging on said independently computed ordering if the results of computation in said plurality of data generating utilities are in disagreement.

13. The method of claim 7, further comprising the steps of:

determining an adjustment value A for an I/O activity towards said each data storage device based on the results of said comparison performed in said step (d), operatively coupling a weighted random value generator to said I/O activity control sub-system, feeding said adjustment value A, said predetermined spread constant percentage C, and a predetermined probability weight value B to said weighted random value generator, and creating a table of values for said each data storage device, said table of values containing said A, B and C values, computing a weighted value W of each said data storage device as:

$$W = N + (A \times C),$$

where N is a number of data storage devices in said pool, performing a summit computation of said weighted value W for said each data storage device with weighted values of other data storage devices in said pool, multiplying said weighted value W of said each data storage device by a constant and forming a table of integers therefrom, generating a random value, and taking the modulus of said random value by the largest weighted value on said table of integers plus 1, and searching in said table of integers a data storage device with an integer value of less or close to the result of modulus computation.

14. A system for data migration between data generating entities and data storage devices enhanced by dynamical adjustment of Input/Output (I/O), activity towards data storage devices for prevention multiple data storage devices from simultaneous failure, the system comprising:

a pool of data storage devices, at least one data generating entity operatively coupled to said pool of data storage devices, wherein said at least one data generating entity is configured to issue at least one I/O request for data migration between said at least one data generating entity and a respective data storage device of said pool thereof, wherein said at least one I/O request includes a number of data units and addresses of respective data storage devices of interest from said pool thereof, a de-clustered Redundant Array of Independent Disks (DCR) structure dynamically formed with at least a subset of said data storage devices of said pool thereof;

a Redundant Array of Independent Disks (RAID) unit configured for computing at least one parity unit associated with said number of data units in said at least one I/O request, and forming a parity stripe composed of said number of data units and said at least one parity unit, and striping said parity stripe in said DCR structure across said at least subset of said respective data storage devices;

a monitoring sub-system operatively coupled to said plurality of data storage devices to monitor the remaining lifespan of each of said plurality of data storage devices; and an I/O activity control sub-system operatively coupled to said monitoring sub-system, said RAID unit, said at least one data generating entity, and said DCR structure being configured to weight the remaining lifespan of each data storage device relative to all data storage devices constituting said pool, and to adjust I/O activity towards said each data storage device in accordance with said data storage device weighted remaining lifespan.

15. The system of claim 14, wherein said I/O activity control sub-system includes:

a list constructing unit operatively coupled to said monitoring sub-system for obtaining therefrom a total number of bytes written with said at least one I/O request to said each data storage device, and configured to form a list of said data storage devices; and a sorting unit operatively coupled to said list constructing unit and configured to sort said data storage devices included in said list in a dynamically alternating order corresponding to said total number of bytes written in said each data storage device.

16. The system of claim 15, wherein said sorted list includes said data storage devices disposed in said dynamically alternating order, and each assigned an order index ranging between 0 and N−1, wherein N is the number of said data storage devices in said pool.

17. The system of claim 16, wherein said I/O activity control sub-system further includes:

a multiplication unit operatively coupled to said sorting unit and configured to multiply said order index of said each data storage device contained in said list by a predetermined spread constant percentage to compute an expected number of bytes for writing in said each data storage device, wherein said predetermined spread constant percentage determines a chronological spread between failures of data storage devices in said plurality thereof.

18. The system of claim 17, further comprising:
a subtracting unit operatively coupled to said multiplication unit and said sorting unit, and configured to subtract said expected number of bytes to be written from said actual number of bytes written in said each data storage device, and
an adjustment unit coupled to said subtracting unit, and configured to adjust the I/O activity towards said each data storage device to receive more of said write I/O request if the results of subtraction output by said subtracting unit is positive, and to receive less of said write I/O requests if a result of said subtraction output by said subtracting unit is negative.

19. The system of claim 18, further including a weighted random value generator coupled to said adjustment unit and configured to build a table of values for data storage device in said pool, and select therefrom a data storage device having the weight value falling in a predetermined range for inclusion in said subset of data storage devices.

20. The system of claim 18, further comprising a recalculating unit coupled to said list sorting unit and configured for periodic recalculation of the contents of said list and the order of said data storage devices therein.

* * * * *